United States Patent
Gat

(10) Patent No.: US 7,466,343 B2
(45) Date of Patent: Dec. 16, 2008

(54) GENERAL LINE OF SIGHT STABILIZATION SYSTEM

(76) Inventor: Nahum Gat, 1227 9th St., Manhattan Beach, CA (US) 90266

( * ) Notice: Subject to any disclaimer, the term of this patent is extended or adjusted under 35 U.S.C. 154(b) by 640 days.

(21) Appl. No.: 10/710,538

(22) Filed: Jul. 20, 2004

(65) Prior Publication Data
US 2006/0017816 A1 Jan. 26, 2006

(51) Int. Cl.
H04N 5/228 (2006.01)
H04N 9/47 (2006.01)
G03B 39/00 (2006.01)

(52) U.S. Cl. .............. 348/208.11; 348/146; 348/208.2; 348/208.14; 396/7

(58) Field of Classification Search ............... 348/146, 348/208.99
See application file for complete search history.

(56) References Cited

U.S. PATENT DOCUMENTS

| | | | | |
|---|---|---|---|---|
| 3,591,250 A * | 7/1971 | Feinstein et al. | ............ | 359/556 |
| 4,034,208 A * | 7/1977 | Vaeth et al. | ................. | 235/411 |
| 4,407,563 A * | 10/1983 | Minott | ....................... | 359/583 |
| 4,825,055 A * | 4/1989 | Pollock | ..................... | 235/411 |
| 4,828,376 A * | 5/1989 | Padera | ......................... | 359/555 |
| 5,424,872 A | 6/1995 | Lecuyer et al. | ............. | 359/811 |
| 5,805,325 A * | 9/1998 | Clune | ......................... | 359/226 |
| 6,008,492 A * | 12/1999 | Slater et al. | ................. | 250/334 |
| 6,108,133 A | 8/2000 | Joffre et al. | ................. | 359/556 |
| 6,370,329 B1 * | 4/2002 | Teuchert | ......................... | 396/7 |
| 6,529,267 B1 * | 3/2003 | Duchon et al. | ................. | 356/2 |
| 6,678,395 B2 * | 1/2004 | Yonover et al. | ............ | 382/103 |
| 6,826,358 B2 * | 11/2004 | Partynski et al. | ............... | 396/7 |
| 7,286,163 B2 * | 10/2007 | Hara et al. | ............. | 348/208.11 |

* cited by examiner

Primary Examiner—Ngoc-Yen T Vu
Assistant Examiner—Paul Saunders
(74) Attorney, Agent, or Firm—Law Office of Robert E. Kasody, P.C.

(57) ABSTRACT

A line of sight stabilization system using two mirrors pivotally mounted to a fixed platform that can be used with existing imaging systems to provide pitch, roll, and yaw compensation while maintaining image orientation. By deflecting only the photons, the inventive system avoids the need to stabilize the entire imaging sensor and optics system. The only mass to move is that of the two imaging system mirrors. By monitoring attitude changes via an inertial measurement system, proceeding platform positions can be estimated for subsequent image acquisitions, and efficient mirror positioning can provide optimal image orientation and stabilization. This approach requires small motors with low torque, providing a less expensive, lightweight, and small image orientation and stabilization system.

18 Claims, 2 Drawing Sheets

GENERAL LINE OF SIGHT STABILIZATION SYSTEM

FEDERAL RESEARCH STATEMENT

This invention was made with U.S. Government support under NASA NAS 13-03014. The U.S. Government has a royalty-free right to the use of this invention.

BACKGROUND OF INVENTION

1. Field of the Invention

The invention relates to optical systems and their elements, and to image orientation and stabilization. More particularly, the invention is directed to line of sight image stabilization by way of movable reflective structures such as mirrors. In particular, the invention concerns hyperspectral and other optical passive and active imaging systems that can benefit from three axes image stabilization as well as orientation, such as airborne and spaceborne (off-nadir viewing) imaging systems. The apparatus of the invention shows particular utility for use with airborne and spaceborne pushbroom hyperspectral and, with forward motion compensation, ultraspectral imaging systems, agricultural and military applications, or in any other application requiring three-axes line of sight image stabilization and orientation.

2. Background

The background of this invention involves imaging systems as well as image orientation and stabilization systems. Multispectral, hyperspectral, ultraspectral, and other imaging systems are well known in the art, as are image orientation and stabilization systems. Typical image stabilization systems reduce the magnitude of changes in the attitude, orientation, or location of light arriving at a detector array in a passive imaging system, or light departing the source on an active airborne system, in one or more axes. Such changes are affected by redirecting incoming or departing light or moving the detector array or source.

Certain imaging systems have particular requirement for image orientation and stabilization. For example, hyperspectral imaging systems are often of a pushbroom type (described below), benefiting from three-axis stabilization. Ultraspectral imaging systems benefit from three-axis stabilization plus forward motion control (hereinafter "FMC") in order to allow extended un-perturbed exposure times. There is considerable prior art to address these stabilization requirements.

Common in the art are hyperspectral imaging systems (both of the pushbroom and whiskbroom type) designed to acquire an image of a narrow strip in the cross-track flight direction (typically one pixel along-track and a fixed width of N-pixels cross-track). Often, such imaging systems rely on the forward motion of the imaging system carrier (for example, an airplane, helicopter, satellite, unmanned aerial vehicle (UAV), or other such equipment) to "sweep" forward. A subsequent narrow strip image is acquired after a fixed amount of time for forward motion. This process can repeat for any length of time. The multiple narrow strip images are "stitched" together to form a complete image, of the fixed N-pixel width, and of a length, equal to the number of snapshots taken while in forward motion. Such an imaging system is typically referred to as a pushbroom imaging system. Pushbroom and other imaging systems are well known in the art. Such system can benefit from image orientation and stabilization as each subsequent image preferentially must align closely with its predecessor image. When the carrier platform (hereinafter "CP") executes attitude changes due to wind gusts or air turbulence, the orientation of the narrow image strip changes and the scene may be under or over sampled. The orientation and stabilization system should maintain each strip in the cross track direction and centered on the nadir view of the platform. Without image stabilization, the series of images are nearly impossible to stitch to form a single, contiguous image of the scene.

Approximately twenty years ago, in one of the earliest pushbroom system patents, Minott (U.S. Pat. No. 4,407,563) acknowledged this issue. Minott explained that the pitch, roll, and yaw of a satellite had to be known in order to compensate for these movements in the post-image processing. While Minott dealt with aberrations due to the use of beam splitters, the problem of compensating for movement in three dimensions has remained critical for multispectral imaging.

In the intervening years, many techniques have been developed for improving image stabilization. These techniques fall into several general categories. The first are the entirely gimbal-mounted systems. A gimbal is simply a device with two equally perpendicular and intersecting axes of rotation, giving free angular movement in two directions. When an imaging apparatus is mounted in a gimbal, the imaging system can target any object in a very large field of regard (hereinafter "FOR"), often encompassing half a sphere or more. Moreover, such a system can remain pointed at a single target and can then compensate for attitude changes in three axes: pitch, roll, and yaw. Gimbals are often seen in police and search and rescue helicopter mounted flood lamps and television-style cameras that can point at, and track, any object on the ground.

A disadvantage of the gimbal systems, however, is that while they can compensate for pitch, roll, and yaw movements, unimportant to tracking systems, television cameras, and flood lamps, the gimbal cannot maintain orientation. Orientation changes occur either when the carrier (typically for tracking setups, a helicopter) approaches or recedes from a target in an off-nadir trajectory, or when the carrier has a speed relative to the tracked object. For example, the orientation of an image captured by a camera mounted in a gimbal underneath a helicopter changes as the helicopter pursues a ground vehicle and catches up to the ground vehicle (in order to fly above the target so that ground units may visually locate the target by observing the more visible helicopter). For a typical gimbal-mounted television camera, this orientation change is unimportant: the television viewer simply sees the target from various angles. The important feature is that the target is somewhat centered in the frame, but the direction that the target is moving relative to the "bottom of the screen" is irrelevant.

In a pushbroom imaging system or in an automated target identification system (comparing the target image to a known database of targets), however, these orientation changes result in columns of the scanned ground grid not being aligned or the identification failing for lack of a steady target image. In the pushbroom case, instead of obtaining nice columns of image, intensive post-imaging processing is needed to compensate for the orientation changes, and often, at best, only the center of the image will be useful, though likely no part of the image will be useful. Where the CP performs a nose pitch upward, certain strips of image will be missing completely and the lost data will not be recoverable. In the target identification case, if the target cannot remain steady in the image, comparison software will not have a sufficiently detailed image from which to make database comparisons (for example, identifying a vehicle, person, or other target of interest). In Ultraspectral Imaging systems, the orientation problem makes registering a series of interferograms impracticable.

A further disadvantage of gimbal systems is that the instrumentation used for imaging must fit within a gimbal. That means that special equipment is needed for use with a gimbal, or at the least, the gimbal may need to be extremely large to accommodate a large imaging apparatus. Larger equipment also requires larger motors, which in turn increases the total bulkiness, cost, and weight of such systems.

A second technique to provide image stabilization is the use of a scanning mirror, located between the imaging system optics (the lens) and the detector array. Such a scanning mirror can be very small and compact. By pivoting the scanning mirror, the image can be redirected to the detector array quickly and effectively. This provides an obvious advantage to cost and system size. However, there are several disadvantages to such systems. The first is that a single scanning mirror can only compensate for two axes of movement. The scanning mirror, like the gimbal system (and in fact, the mirror can be mounted in a very small gimbal within the camera optics), can compensate for pitch and roll, but not yaw. Yaw, or a change in orientation of the CP, cannot be changed with a single mirror. A further disadvantage of this art is that such a scanning mirror must be built into the optics, which then requires special arrangement of the fore optics of the sensor. A scanning mirror of this type cannot be added to an existing optical system without significant retrofit cost and technology. This is a costly consideration for existing imaging systems.

Finally, the third, and heretofore most accurate of the typical image stabilization techniques is the use of a large "flatbed" on which to mount the optics system. The flatbed is motorized to move in all directions, allowing the imaging system to be tilted to compensate for pitch, roll, and yaw. In fact, by way of a series of complex calculations, appropriate pitch, roll, and yaw compensations can combine to further provide FMC, as well. Although such flatbed image stabilizations systems appear to resolve the orientation and stabilization problem for pushbroom scanners, there are significant disadvantages to these systems. Such imaging system stabilization control must move the entire imaging system. In order to stabilize images for large optical systems, the motors and entire flatbed system must be very robust. Such motors need to be able to quickly move a large mass, accurately, and in constantly changing directions. Such motors are very expensive, thus making flatbed stabilization not very cost effective. If less expensive motors are used, the flatbed stabilization cannot respond to changes of direction as quickly and the image is less (or perhaps insufficiently) stabilized.

Most recently, several companies have began testing new stabilization systems, including combining a pivoting, gimbal-type system with a Dove Prism (NovaSol, in Hawaii, US) and combining two mirrors in the imaging system optics and further allowing the entire optics assembly to move in order to provide three axes of stabilization (Zeiss Optronik GmbH, Germany, U.S. Pat. No. 6,370,329). The gimbal-based system continues to suffer from the limitations imposed by requiring the optical system to fit within a gimbal, while the mirrored, moveable optics requires special imaging systems. These systems thus still do not provide for an economically feasible method of retrofitting image stabilization to existing systems, or provide compact, cost-effect image stabilization to new systems.

Accordingly, there is a need in the art for a simple, effective, and cost efficient image orientation and stabilization system that overcomes or avoids the above problems and limitations.

SUMMARY OF INVENTION

The invention comprises a General Line Of Sight Stabilization System (hereinafter referred to as "GLOSS system" or "GLOSSS" interchangeably) using two mirrors pivotally mounted to a fixed platform that can be used with existing imaging systems while providing pitch, roll, and yaw compensation while maintaining image orientation.

By deflecting only the photons of the scene (passive imaging) or source (active imaging), the inventive system avoids the need to stabilize the entire imaging sensor and optics system. The only mass to move is that of the two imaging system mirrors. This approach requires small motors with low torque, providing a less expensive, lightweight, and small image orientation and stabilization system.

The invention further comprises hardware control means that allow predictive and responsive image stabilization to quickly and accurately compensate for typical platform instability without the use of large, expensive motors and components. The inventive system limits mechanized motor control to the moving of two pivoted, and relatively small, mirrors.

The invention monitors the CP attitude changes via an inertial measurement system, predicts the expected platform position for subsequent image acquisitions, and controls and positions the mirrors so as to provide the optimal orientation and stabilization for the subsequent image. The inertial measurements unit can be one a preexisting one (common equipment on many airplanes, UAVs, satellites, or other such CPs) or can be specifically installed as a part of the inventive system.

The invention additionally encompasses calculation instructions and optionally calculation hardware for determining the coupled movement of the two mirror system, making possible the object of using a compact, independent image orientation and stabilization system capable of working with a wide variety of imaging systems and carriers (helicopters, airplanes, satellites, and others). The invention also makes possible the object of upgrading and retrofitting existing image acquisition systems at minimal cost.

A further object of the invention is to minimize the weight of the entire system, critical for use in space and weight constrained applications, including military and spaceborne purposes.

Additionally, an object of the invention is to provide a orientation and stabilization method for ultraspectral imaging, using the inventive mirror control method to provide forward motion compensation, allowing the imaging system to receive a stable, continuous, non-moving image for a sufficient time to acquire data for a relatively long exposure time as required for subsequent Fourier transformation.

Further applying the inventive image stabilization system to other optical systems, it is an object of the present invention to provide image orientation and stabilization for active airborne laser altimeters and other active air- or spaceborne systems. Similarly, it is an object of the present invention to provide image orientation and stabilization to passive still cameras, television cameras, and any other optical systems that can benefit from three axes stable and consistently oriented images.

The scope of application of the inventive apparatus is broad, as a number of alternative image stabilization and control schemes may suggest themselves to those skilled in the art as suitable for a wide variety of image stabilization applications, both for pushbroom hyperspectral systems and for other general optical systems. These applications include agricultural field scanning and spaceborne weather data acquisition, to name a few.

BRIEF DESCRIPTION OF DRAWINGS

The accompanying views of the drawings are incorporated in, and constitute a part of, this specification and illustrate one or more exemplary non-limiting embodiments of the invention, which, together with the description, serves to explain the principles of the invention. In the drawings.

DETAILED DESCRIPTION

The following detailed description illustrates the invention by way of example, not by way of limitation of the principles of the invention. This description will clearly enable one skilled in the art to make and use the invention, and describes several embodiments, adaptations, variations, alternatives, and uses of the invention, including what are presently believed to be the best modes of carrying out the invention.

In this regard, the invention is illustrated in the several figures and is of sufficient complexity that the many parts, interrelationships, process steps, and sub-combinations thereof simply cannot be fully illustrated in a single patent-type drawing or table. For clarity and conciseness, several of the drawings show particular elements in schematic and omit other parts or steps that are not essential in that drawing to a description of a particular feature, aspect, or principle of the invention being disclosed.

Figure 1:
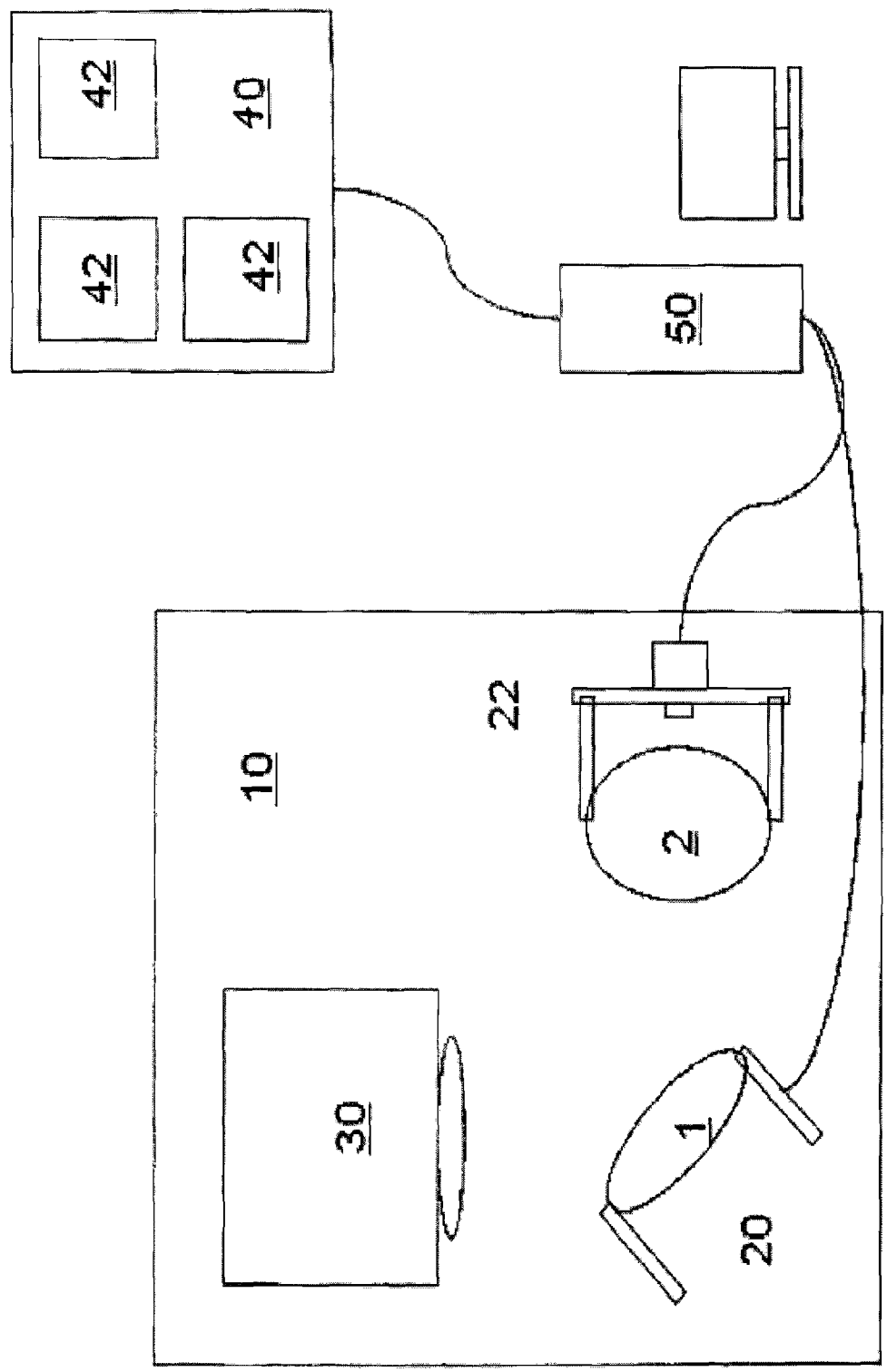
FIG. 1 shows a schematic view of the current best mode of the inventive apparatus, including the two mirrors (one single-axis pivot mounted, the other gimbal mounted), the mounting platform, and a typical pushbroom hyperspectral imaging system for purposes of clarity.

The inventive GLOSS system is generally described by FIG. 1, which shows the current best mode application of the present invention. The system is comprised of two mirrors mounted to a platform (10) through small gimbals (20, 22). Mirror One (1) is mounted through a single axis pivot (20) (though a gimbal could be used, as well), while Mirror Two (2) is mounted through a two-axis gimbal (22). The platform can be solidly affixed to any optical imaging or projecting system, hyperspectral, ultraspectral, video or still camera, laser projection, or otherwise. Here, the exemplary optical system is a pushbroom hyperspectral system (30). The platform is then attached to the CP (not shown in the Figure).

The first mirror is mounted to the platform by way of a one-axis pivot (20). The second mirror is mounted to the platform by way of a two-axis pivot (22). The mirrors are mounted such that in their nominal positions, the three axes are perpendicular to each other, and parallel to the CP's three axes of pitch, roll, and yaw. While the aircraft attitude is changing, the mirrors (1, 2) compensate for the attitude and orientation change, which will typically result in the mirror-axes no longer remaining parallel to the aircraft axes. The compensation for pitch, roll, or yaw may require mirror pivoting in a singular or coupled manner, depending on the specific attitude or orientation correction. As the mirrors (1, 2) move, the reflections move and require further compensation, such that most changes in one mirror require coupled, and calculated, changes in the second mirror. Thus, a change in roll alone will require an adjustment to both mirrors (1, 2) to compensate.

The mirrors (1, 2) are mounted in a plane with the imaging system (30), and that plane is parallel to the target ground, allowing the imaging system to "see" perpendicular to the ground, looking down onto linear strips of ground. The linear strip of ground is extended perpendicular to the direction of travel of the plane. In this way, the pushbroom system (30) can make successive scans of the ground as the carrier moves forward.

The mirrors (1, 2) are associated with an inertial measurement system (40) (hereinafter "IMS" or "IMU" for the "unit" itself) or an Attitude and Heading Reference System (hereinafter "AHRS"). Either of these devices contains three orthogonal gyrometers (42) (also commonly referred to as "gyros") that measure the CP rotation rates about the three axes. If the IMU (40) is not located at the roll center of the CP, then the calculation system must account for the IMU displacement from the origin. The IMU (40) is coupled to a computer (50) and the incoming data are used to determine the necessary motion for the two mirrors (1, 2) to completely orient and stabilize the image. The computer (50) sends signals to the mirror control motors (again, not shown), which in turn, adjust the mirrors (1, 2). As the mirrors (1, 2) are relatively low in mass and the compensations are small in size or angles, such compensations can be nearly instantaneous, providing very accurate image stabilization.

In the preferred embodiment, the mirrors move in a continuous and smooth pattern predictively "mirroring" the aircraft motion. In this way, the mirrors are not subject to continuous "stop" and "go" commands, reducing the associated accelerations and thus reducing the torque-requirement for the motors, allowing smaller and less expensive motors. By setting the mirrors in a continuous motion of the same angular velocities and accelerations as the CP undergoes, the mirrors are in the right position for each snapshot of the sensor (noting that mirror motion is generally opposite to CP direction, with angular deflections being about one half of the CP attitude changes).

The objective of the GLOSSS is to have the mirror in the correct position at the time each frame is captured. The predictive mirror movements are derived from the IMS information. From the axes rotation rates and integration over time, the actual angle of the CP is calculated. The calculations must compensate for system noise, drift, and temperature-induced errors in the gyrometers. Next, by knowing the aircraft angle over several time units and knowing the angular rotation rates, the location of the CP in the next time step can be predicted. Such a predictive algorithm can be obtained by a variety of means, from simple extrapolation to curve fitting using polynomial spline-fit or other such methods. More sophisticated predictive tools can be employed, as well, including some that tend to compensate for system noise, such as a Kalman filter based tool. Once the proceeding location is predicted, the GLOSS system must compute the desired mirror positions to compensate for the CP predicted position, and cause the mirror motors to move at the proper rate to that position.

Although the optimal motion for the mirrors is at a rate similar to that of the CP, in situations where the CP is suddenly caused to move along one of its axes (a gust of wind, a low pressure pocket, or otherwise), the proceeding location predictions may be incorrect, so the predictive algorithms must "catch up." In order to catch up, the GLOSS system must be capable of quickly deploying the mirrors with new instructions to compensate for the unexpected stabilization need.

Figure 2:
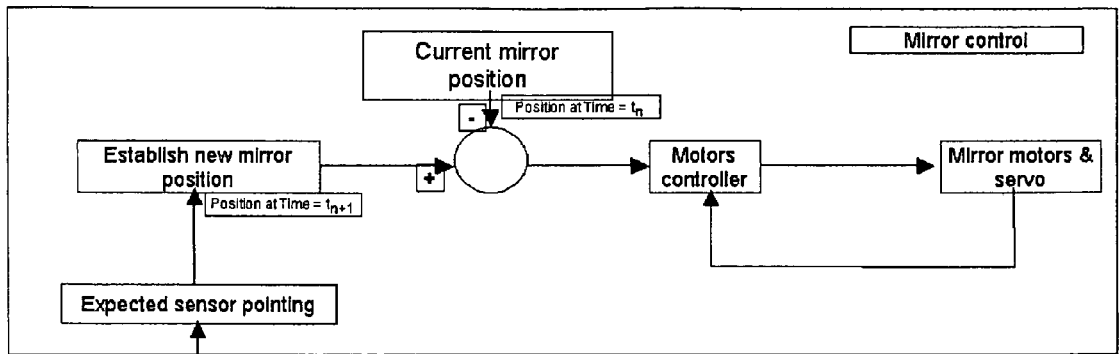
FIG. 2 shows a flow chart of the operation of the mirror control system.
Figure 2:
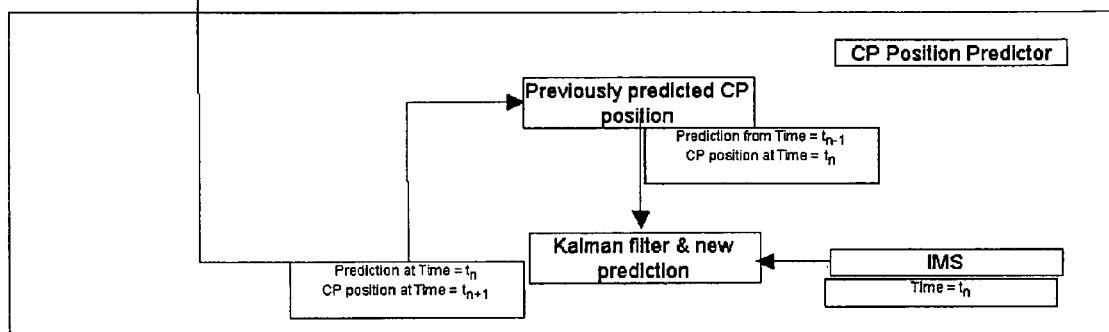
Figure 2:
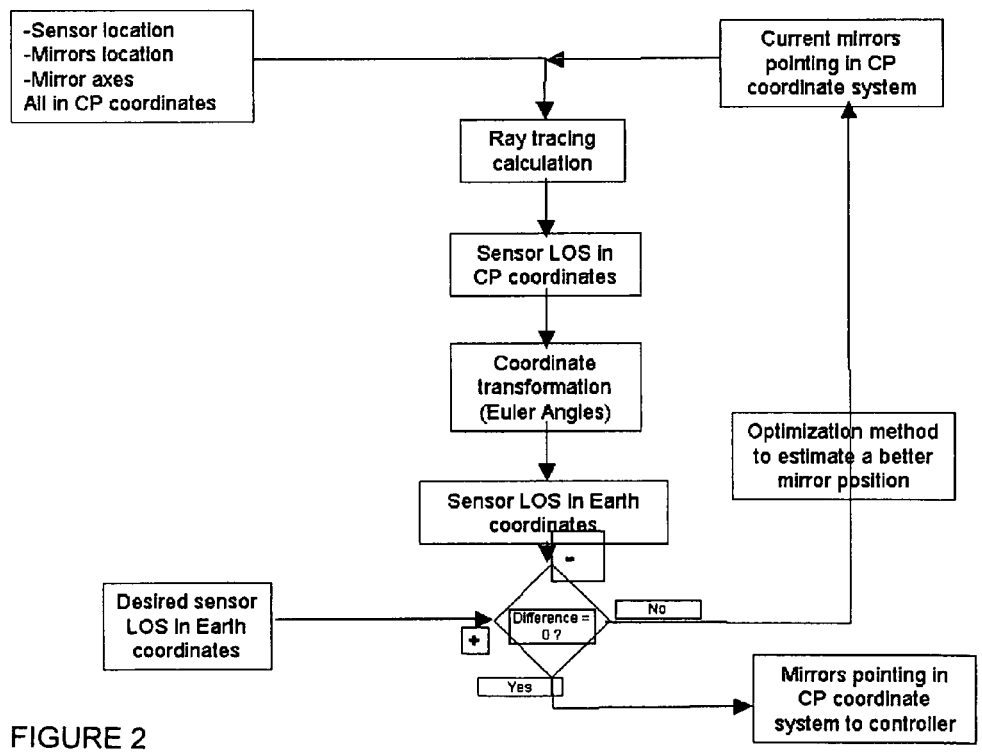

FIG. 2 is a Flow Chart of the system control logic, as well as the mirror control logic to provide pitch, roll, and yaw corrections for the mode of use shown in FIG. 1. As the table shows, the Mirror Control aspect of the Mirror Control System starts with the current mirror positions (at time t(n)). The mirror control system then activates the Motor Controller, which in turn activates the Mirror Motors and Servos, which feedback to the Motor Controller. This action is prompted by an instruction to establish a new mirror position for the proceeding time interval, time t(n+1). The new mirror position instruction is derived from the expected imaging sensor or CP orientation and position for time t(n+1), which is determined by the CP Position Predictor (hereinafter the "CPPP"). The CPPP takes input from the IMS and the previously predicted CP position and applies a Kalman (or other) filter to create a new prediction for time t(n+1).

The Mirror Control system receives the sensor and CP location information, as well as the mirror orientation and location information, and the mirror axes status. This information is added to the current mirror pointing and a ray tracing calculation is made. The line of sight for the imaging system is calculated using the same coordinate system as was used for the carrier and mirror positions. A coordinate transformation is applied (Euler Angles) and the resultant information is provided as the imaging system line of sight. This data is compared to the desired line of sight for the imaging system. If there is no difference, the system flags the mirrors as pointing appropriately. If there is a difference between the desired and actual line of sight, the mirror control system applies an optimization method to estimate a better mirror position. This new estimate is fed to the mirror control system.

By following the simple logic system described by FIG. 2, the mirrors can continuously provide properly oriented and stabilized images to the imaging system.

INDUSTRIAL APPLICABILITY

It is clear that the image stabilization system of the present invention will have wide industrial applicability, not only to agricultural and military applications, but also to other applications where image stabilization is necessary or desired, including still photography, television, and other such applications. The inventive apparatus and method will further have great applicability in any circumstance where image stabilization is desired to be added to existing imaging systems, or where space, weight, or cost are important factors.

What is claimed is:

1. A compact line of sight stabilization system for use with an imaging system located about an unstable carrier platform, said stabilization system comprising:
    at least two mirrors, each of said mirrors being mounted to a fixed platform by aiming means and in a plane substantially parallel to a target to provide substantially orthogonal observation of a ground position;
    said aiming means allowing independent rotation of said mirrors about at least one of the axes in the plane of said mirrors;
    at least one of said mirrors being mounted by aiming means allowing rotation about at least two of said axes;
    a hardware control means for directing said aiming means in response to measurements taken from three orthogonally positioned gyrometers that measure a rotation rate of the unstable carrier platform about the at least two of said axes; wherein the aiming means occurs without reorientation of the fixed platform relative to the unstable carrier platform; and wherein movement of the at least one of said mirrors occurs in a substantially continuous pattern that predicatively mirrors motion of and approximately angular velocities and accelerations of the unstable carrier platform;
    said stabilization system being mounted in a line of sight of said imaging system; and
    said stabilization system providing at least one of pitch, row, yaw, and forward motion compensation corrections while maintaining consistent image orientation, for said imaging system.

2. The stabilization system as in claim 1 wherein said imaging system comprises at least one of a pushbroom, whiskbroom, Fourier transform, and electronically tunable filter type sensor systems.

3. The stabilization system as in claim 1 wherein said imaging system comprises one of a multispectral, hyperspectral, or ultraspectral sensor system.

4. The stabilization system as in claim 1 wherein said carrier platform is selected from an airplane, a helicopter, a satellite, an automobile, or a boat.

5. The stabilization system as in claim 1 wherein said aiming means is selected from at least one of a mechanical, piezoelectric, and electromagnetic means.

6. The stabilization system as in claim 1 wherein said hardware control means receives movement data from at least one of pitch rate, roll rate, yaw rate, and forward motion rate sensors.

7. The stabilization system as in claim 6 wherein said sensors exist independently of said stabilization system.

8. The stabilization system as in claim 6 where said sensors comprise at least one of an inertial measurement system and an attitude and heading reference system.

9. The stabilization system as in claim 6 wherein said hardware control means comprises a computer system receiving said movement data from said at least one sensor, said computer system additionally comprising algorithm means for determining the current angle of said carrier platform from said sensor data and the integration over time of said movement rates.

10. The stabilization system as in claim 9 wherein said mirrors are aimed responsively to said current angle of said carrier platform.

11. The stabilization system as in claim 10 wherein said computer system comprises additional algorithms to predict subsequent angles for said carrier platform from said movement data and said current angle.

12. The stabilization system as in claim 11 wherein said predictive algorithm additionally accounts for at least one of system noise, drift, and temperature-induced errors.

13. The stabilization system as in claim 11 wherein said hardware control means aims said mirrors to compensate for said predicted new angle, before said carrier platform reaches said new angle.

14. The stabilization system as in claim 11 further comprising a feedback algorithm wherein said feedback algorithm determines whether said line of sight matches the line of sight obtained from said predictive angle algorithm.

15. The stabilization system as in claim 14 wherein said hardware control means applies an optimization algorithm to compensate for mismatches found by said feedback algorithm.

16. The stabilization system as in claim 1 wherein said aiming means causes at least one of said mirrors to rotate such that said mirrors adjust said line of sight of said imaging system providing compensation for at least one of pitch, roll, yaw, and forward motion.

17. The stabilization system as in claim 1 wherein said imaging system requires a stable and non-changing image during exposure time and wherein said stabilization system provides said forward motion compensation to provide said imaging system with said nonchanging image.

18. The stabilization system as in claim 1 wherein said imaging system is an ultraspectral imaging system.

* * * * *